United States Patent

Paetz et al.

[11] Patent Number: 5,520,434
[45] Date of Patent: May 28, 1996

[54] PANEL SYSTEM WITH VARIABLE TRANSPARENCY

[75] Inventors: Werner Paetz, Zittau; Stefan Hauser, München, both of Germany

[73] Assignee: Webasto-Schade GmbH, Germany

[21] Appl. No.: 245,642

[22] Filed: May 18, 1994

[30] Foreign Application Priority Data

May 27, 1993 [DE] Germany ............... 43 17 644.5

[51] Int. Cl.⁶ ............................................. B60J 7/00
[52] U.S. Cl. .................. 296/211; 296/215; 296/221; 296/222; 359/228; 359/886; 49/21
[58] Field of Search ................ 296/211, 215, 296/216, 221, 223, 96.19, 121, 222; 359/886, 228; 49/21, 38, 507; 160/DIG. 2, DIG. 3

[56] References Cited

U.S. PATENT DOCUMENTS

| 2,373,214 | 4/1945 | Wolkenhauer | 49/21 |
|---|---|---|---|
| 2,474,712 | 6/1949 | Aparicio | 296/96.19 |
| 2,537,011 | 1/1951 | Aparicio | 296/96.19 |
| 3,545,806 | 12/1970 | Ventre | 296/223 |
| 3,695,681 | 10/1972 | Dockery | 359/886 |
| 4,236,360 | 12/1980 | Parrier et al. | 359/886 |
| 4,320,921 | 3/1982 | Schätzler | 296/213 |
| 4,726,656 | 2/1988 | Schofield et al. | 359/886 |
| 5,154,481 | 10/1992 | Paetz et al. | 296/211 |
| 5,231,530 | 7/1993 | Yen | 359/886 |
| 5,261,722 | 11/1993 | Staley et al. | 296/211 |

FOREIGN PATENT DOCUMENTS

| 4233994 | 9/1993 | Germany | 296/223 |
|---|---|---|---|
| 1145060 | 3/1969 | United Kingdom . | |

*Primary Examiner*—Dennis H. Pedder
*Attorney, Agent, or Firm*—Sixbey, Friedman, Leedom & Ferguson; David S. Safran

[57] ABSTRACT

A panel system with variable light transmissiveness is formed of two essentially parallel transparent panels, and a seal encircling both panels. A cavity, defined by the panels and the seal, communicates with a liquid reservoir, from which liquid can be conveyed into the cavity by a transport element for the purpose of changing the distance between the panels by changing the thickness of the liquid layer between the panels. In order to render the panel system suitable for usage in a cover of a vehicle sliding/lifting roof, the liquid reservoir and the transport element, which is driven by a pole-reversible electric motor, are supported at an inner cover plate, which has an undercut in an edge portion in which an electrical contact element for establishing a conductive connection between the electric motor and the vehicle battery is disposed.

8 Claims, 3 Drawing Sheets

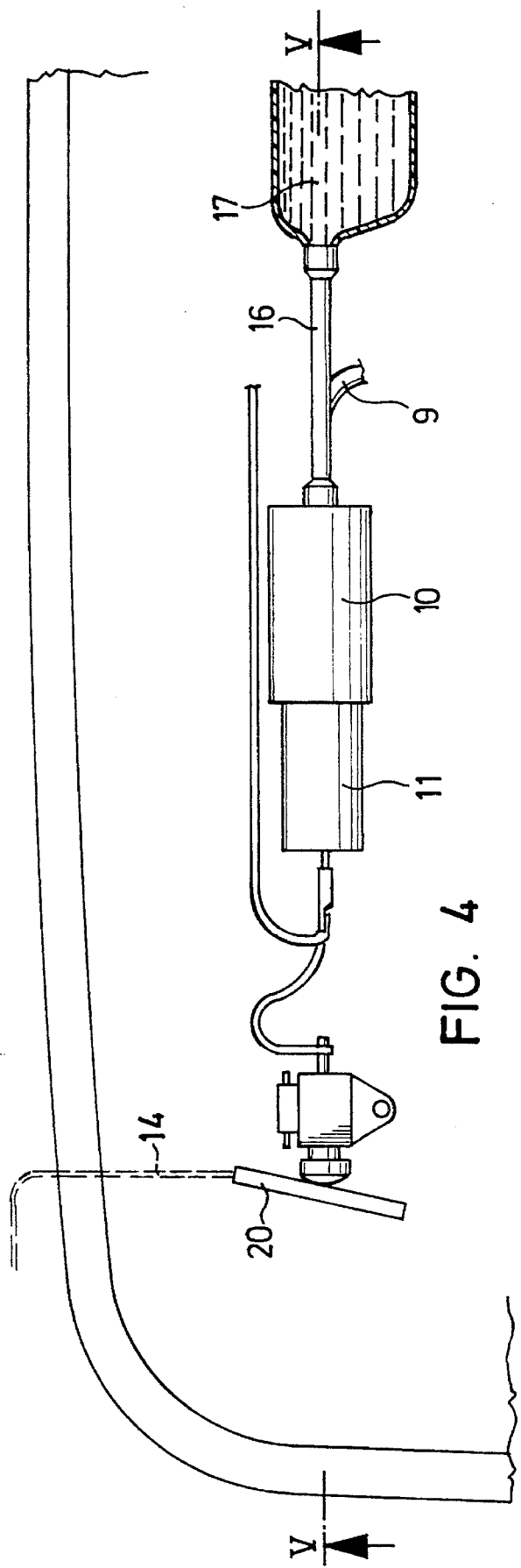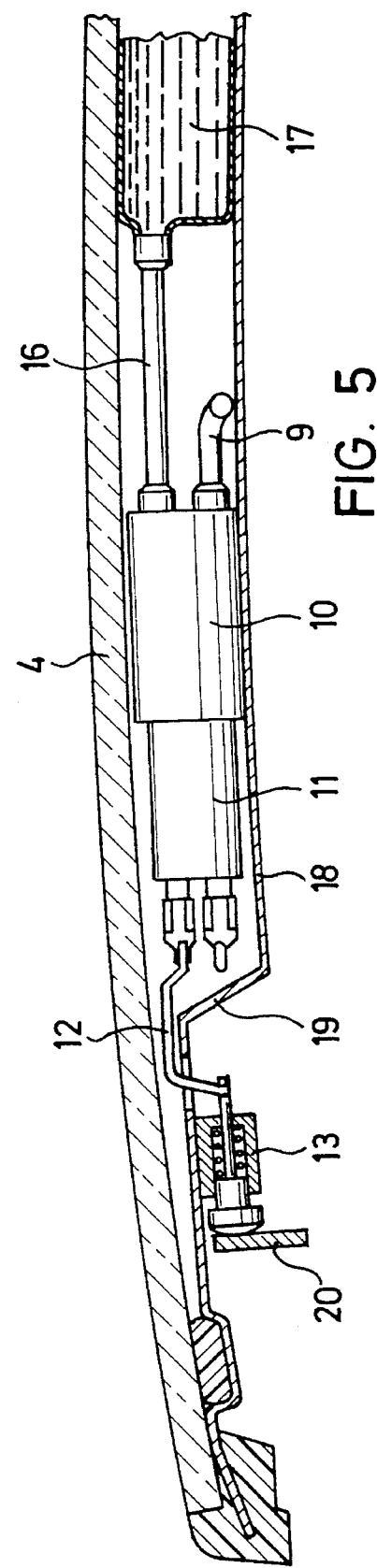

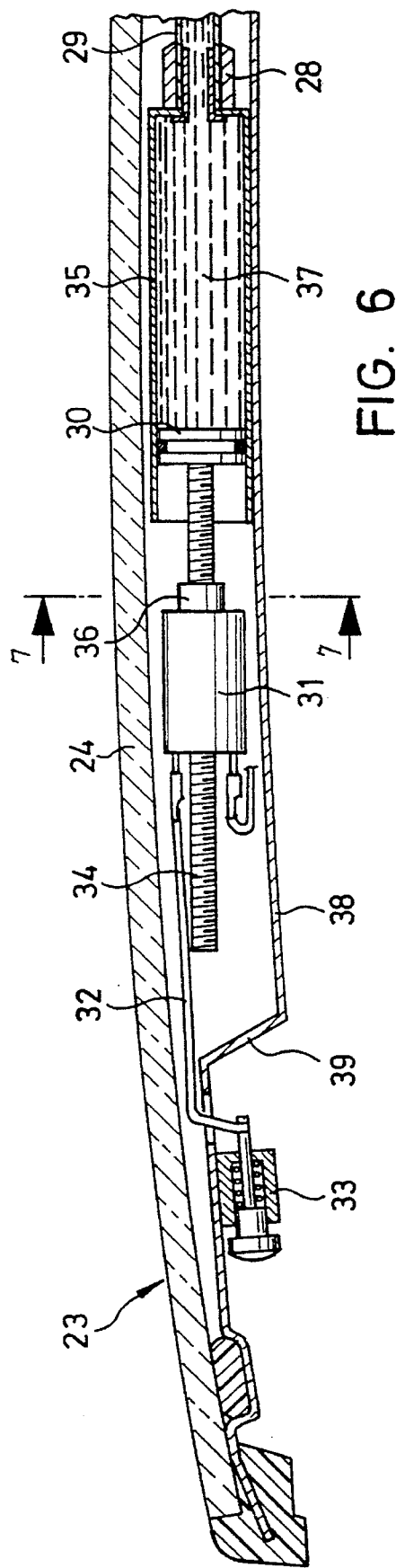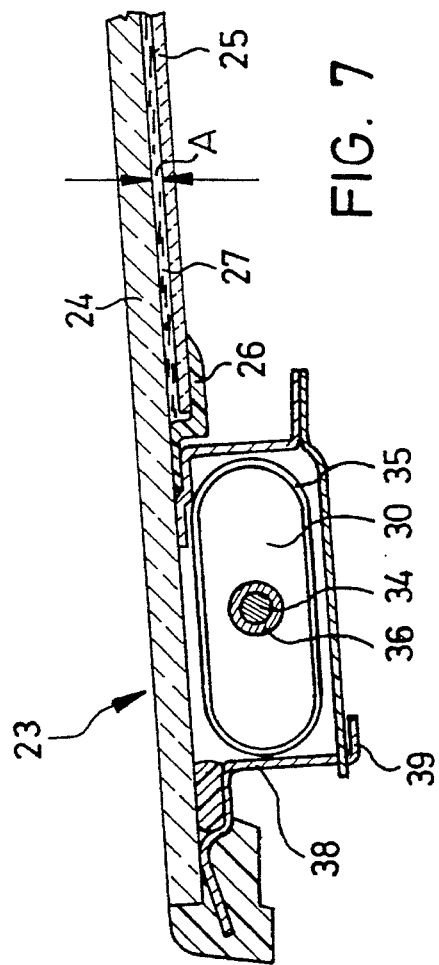

PANEL SYSTEM WITH VARIABLE TRANSPARENCY

BACKGROUND OF THE INVENTION

The invention relates to a panel system with variable transparency, in which two essentially transparent panels are connected by a resilient seal which permits the distance between the panels to be varied by controlling the thickness of a liquid layer between the panels, and more particularly, relates to the use of such a panel system in a sliding/lifting roof cover of a vehicle.

Such a panel system with two transparent panels, disposed essentially parallel to each other, with a resilient seal connecting both panels in a manner which permits a change in the amount of light ray absorbing liquid located between the two panels via a control element admitting and withdrawing liquid to and from a liquid reservoir and a cavity between the panels is known, for fixed windows of buildings and motor vehicle windshields, from British Patent 1,145,060. The liquid reservoir and the transport element described therein are arranged externally of the panel system at a location spaced therefrom. Such an arrangement as is described therein can be utilized for windows of buildings without significant drawbacks. However, for usage in a movable cover of a vehicle sliding/lifting roof, such a panel system is hardly suitable. That is, for the cover to be moved for the purpose of exposing a roof opening, leading to and from the reservoir, the hose lines would have to be carried along, which, in turn, would result in an unsightly appearance and premature wear of the hoses.

SUMMARY OF THE INVENTION

The invention has the objective to further develop a window panel system of this kind, and to make it suitable for use in a movable vehicle cover of a sliding/lifting roof.

This objective is achieved, in accordance with the preferred embodiments of the invention, by providing that the liquid reservoir, along with the panels and the transport element, powered by a pole-reversible electric motor, are supported at a frame element (inner cover plate) which is arranged under an edge portion of at least one of the panels. The frame element, within the area of the front pivot support of the cover, has a resilient contact element for establishing a conductive connection between the electric motor and the vehicle battery, at least in the closed position of the cover. Thus, in accordance with the invention, all required components for varying the thickness of the liquid layer between the panels are arranged in the panel system of the cover itself. Only the contacts for the electric motor must be capable of cooperating with the cover movements. Well-developed technical solutions have been found with regard to such contacts, as for instance, are known with regard to the contacting of a cover that converts solar energy, described in U.S. Pat. No. 5,154,481. Due to the fact that a variation of the light transmissiveness of the cover is only meaningful in the closed or upwardly tilted positions of the cover, contacting by means of a resilient contact element in the area of the front pivot axis of the cover can be accomplished without difficulties. When the cover is lowered, and rearwardly displaced under the fixed roof skin, its light transmissiveness no longer plays a role.

In another advantageous embodiment, the transport element comprises a pump which is in communication with a flexible liquid reservoir and the cavity, and which conveys the liquid from one to the other based upon the rotational direction of the electric motor.

An alternative embodiment provides that the liquid reservoir is formed by a rigid cylinder in which a piston is displaceable by way of a piston rod, which is acted upon by the electric motor. It is advantageous if the piston rod is a threaded rod which is directly acted upon by a nut-like drive element of the electric motor.

In still another variation, the piston rod can be a gear rack which interacts with a pinion driven by the electric motor.

It is of further advantage when the electric motor, the transport element, and the liquid reservoir are arranged in a recessed area, disposed in a front transverse portion of a frame element in the form of a peripheral cover plate of the cover. The holding elements for receiving the above mentioned components can be directly molded at such a recessed area during press-forming of the inner cover plate.

Furthermore, it is advantageous when the lower panel, in the area of the inner cover plate, is smaller than the upper panel. This measure prevents the construction height in the edge zone of the cover frown being unnecessarily increased. The components (motor, transport element, liquid reservoir), required for the darkening of the panel system, advantageously, are arranged in the edge zone of the cover in which the upper panel is not light transmissive due to imprinting, which renders the structural elements invisible from the outside, without impairment of the visual appearance of the cover.

BRIEF DESCRIPTION OF THE DRAWINGS

The following examples describe the invention by way of the drawing which show:

FIG. 4 is a top view of a front area of the cover, with the upper panel removed;

FIG. 5 is a longitudinal sectional view parallel to the front edge of the cover taken along line 5—5 in FIG. 4;

FIG. 6 is an alternative embodiment to that of FIG. 5; and

FIG. 7 is a cross sectional view through the front area of the cover taken along line 7—7 in FIG. 6.

DETAILED DESCRIPTION OF THE PREFERRED EMBODIMENTS

A vehicle 1 has a roof opening, in its fixed roof 2, which can be opened and closed by way of a transparent cover 3. Opening is either accomplished by upward swinging of cover 3, so as to lift its rearward edge above the height of fixed roof 2, around a pivot axis disposed near its front edge, or is effected by lowering of its rear edge, with a subsequent rearward displacement of cover 3 under the fixed roof 2. Roofs of this kind, which can be opened, are conventionally known as sliding/lifting roofs, and a description of the associated mechanical means can be dispensed with here since they form no part of the present invention and descriptions thereof can be readily found (e.g., see U.S. Pat. No. 4,320,921).

Figure 2:
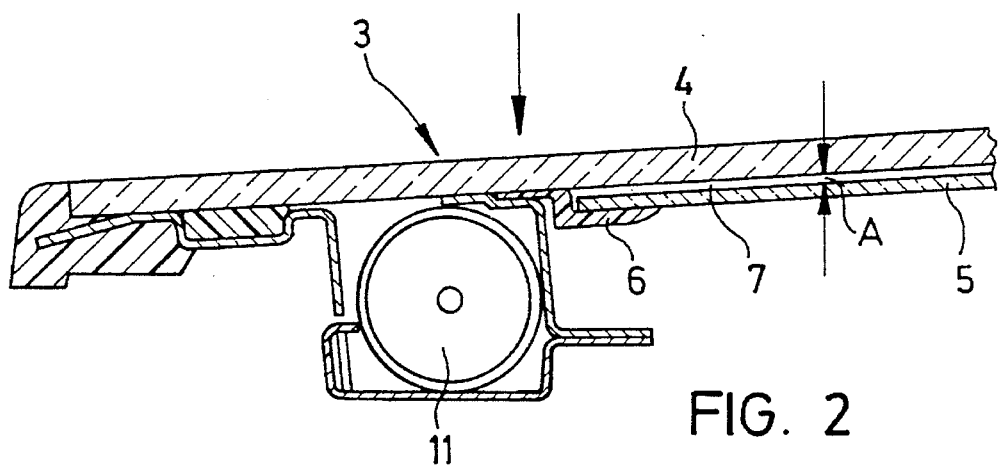
FIG. 2 is a partial cross sectional view through a cover taken along line 2—2 in FIG. 1.

As FIG. 2 illustrates, cover 3 comprises an upper panel 4 and a parallel lower panel 5 therebelow. Lower panel 5 only extends across the mid-section of upper cover 4, and is connected with the upper panel 4 by an encircling seal 6, such that a cavity 7 is formed between the two panels 4 and 5 whose volume is variable based on the distance A between the panels 4, 5 which is likewise variable. The resilient material of seal 6 permits movement of lower panel 5 to enlarge or reduce its distance A from upper panel 4.

Figure 1:
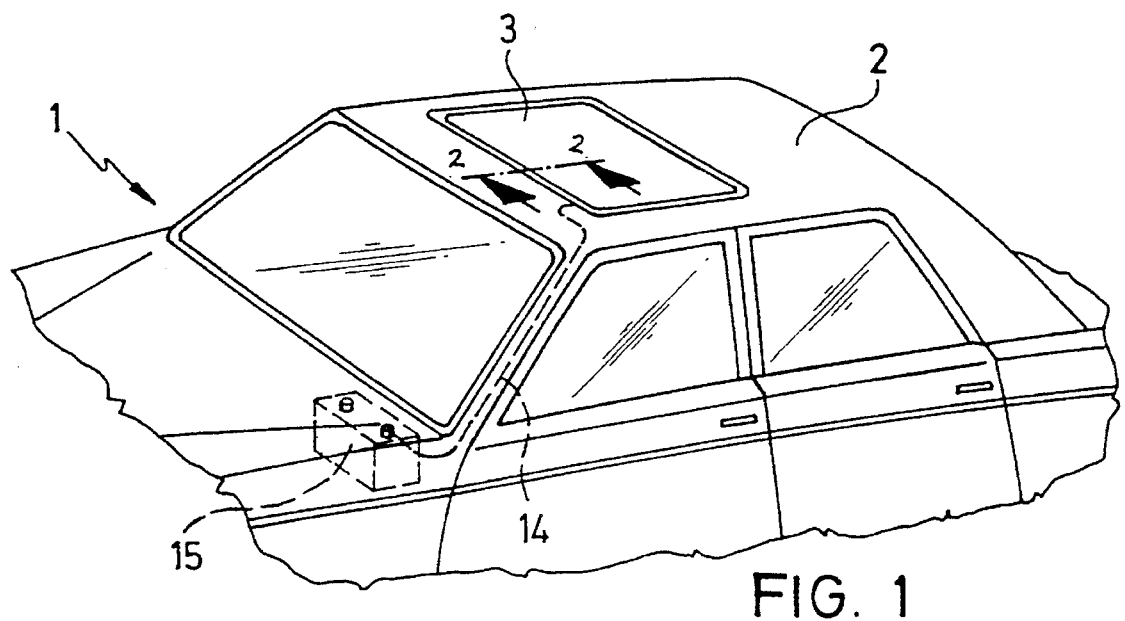
FIG. 1 is a perspective partial view of a portion of a vehicle having a sliding/lifting roof.
Figure 3:
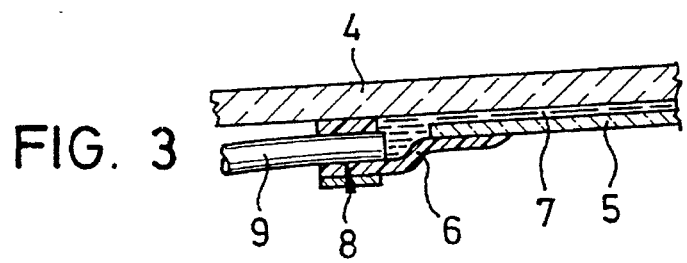
FIG. 3 is a section through the seal between the panels of the cover in the area of a hose inlet.

As is shown in FIG. 3, seal 6 is penetrated by a hose inlet 8, at least at one point of its periphery, through which hose 9 is introduced into cavity 7 for insertion or removal of liquid matter. This liquid has a dark coloration, and due to thickness of the liquid layer, resulting from the quantity of the liquid pumped into cavity 7, causes cover 3 to be light transmissive to a greater or lesser extent. To this end, hose 9, as can be seen in FIGS. 4 and 5, is connected with pump 10, which is driven by pole-reversible electric motor 11. Electric motor 11 is connected by way of cable 12 and a resilient contact element 13, as well as by means of an electric lead 14 in fixed roof 2 to a vehicle battery 15, indicated by a dashed line in FIG. 1. For establishing electrical contact, in dependence upon the position of cover 3, a spring (FIG. 5) keeps element 13 in contact with contact rail 20, which, in turn, is connected to fixed roof 2 and connected to electrical lead 14. Contact element 13 and contact rail 20 are arranged such that they remain in contact as long as cover 3 is either in its closed or its upwardly swung positions. When the rear edge of cover 3 is lowered, and cover 3 is subsequently displaced below the fixed roof 2, the contact, and with it the electrical connection between the battery 15 and the motor 11, ceases. The inclined position of contact rail 20, relative to the vehicle's center longitudinal axis, causes automatic resumption of contact between contact element 13 and contact rail 20 during closing of cover 3. Of course, any of the forms disclosed for the contact device of the vehicle roof of the above-noted U.S. Pat. No. 5,154,481 can be used to electrically connect motor 11 to battery 15.

Pump 10, in addition to being connected to hose 9, is also connected to a hose 16 which leads to liquid reservoir 17, which has flexible walls. As shown in FIG. 5, this liquid reservoir 17, electric motor 11, and pump 10, as well as contact element 13, are arranged at a frame element of the cover 3 which is formed by an inner cover plate 18, which underlies the peripheral area of cover 3. Inner cover plate 18, in the front portion of cover 3, extending transversely to the vehicle forward direction, has a recessed area 19 for receiving electric motor 11, pump 10 and liquid reservoir 17. In this area, only the upper panel 4 of the panel system of cover 3 is present due to the smaller size of lower panel 5. As shown in FIG. 2, lower panel 5 is recessed radially inwardly from the area of the periphery of cover 3 where the inner cover plate is located.

When driving electric motor 11 in one rotational direction, pump 10 is actuated in such a manner that it suctions the liquid from liquid reservoir 17, via hose 16, and conveys it, via hose 9 and hose inlet 8, into cavity 7. Due to the buildup of liquid pressure thus caused, the distance A between upper panel 4 and lower panel 5 is increased, whereby cover 3, in its central area, becomes increasingly more opaque due to the increased thickness of the darkening liquid. If, however, electric motor 11 is driven in the other rotational direction, pump 10 suctions liquid from cavity 7, via hose 9, and returns it, via hose 16, to reservoir 17. The darkening liquid layer thickness (distance A), which is thereby reduced, effects an increasing light transmissiveness of the panel system.

In an alternative embodiment, illustrated in FIGS. 6 and 7, pump 10 is replaced by a piston/cylinder arrangement. All elements in FIGS. 2 to 5, which are identical to those contained in the first example, were given identical reference numerals, increased by 20. Accordingly, cover 23 comprises an upper panel 24 and a lower panel 25 extending across its center section and attached to upper cover 24 by means of a flexible, encircling seal 26. Between these two panels 24, 25 there is a cavity 27, which is in communication with liquid reservoir 37, via hose inlet 28 and hose 29.

As can be seen from the sectional view according to FIG. 7, cylinder 35 has an elongated, rounded cross section with fixed walls and piston 30 is longitudinally displaceable therein. An O-ring seal is provided on the piston 30 to prevent leakage between piston 30 and cylinder 35. A piston rod 34 is fixedly arranged at the backside of piston 30, and is threaded, or, alternatively, is provided with a gear rack for interacting, respectively with a nut-like drive element 36 of an electric motor 31, or, with a pinion driven by electric motor 31 to effect a longitudinal movement of piston 30 in cylinder 35.

Electric motor 31 is electrically connected with resilient contact element 33 by way of a cable 32. Analogous to the FIG. 1 example, this contact element 33 engages a contact rail (corresponding to rail 20) which is electrically connected with the vehicle battery. When driving the electric motor 31 in one rotational direction, piston 34 is moved to the fight in FIG. 6, and thereby, presses the liquid from liquid reservoir 37 into the cavity 27 between panels 24 and 25 via hose 39. The distance A, is thus caused to increase by the influx of darkening liquid, the thicker liquid layer diminishing the light transmissiveness of the central region of cover 23. Driving electric motor 31 in the opposite direction, effects a retractive displacement of piston 30, whereby liquid is sucked from cavity 27 back into liquid reservoir 37, and the distance A between the upper panel 24 and lower panel 25 is correspondingly diminished. In the second example, again, all components used for changing the light transmissiveness of cover 3 or 23 are arranged in a recessed area 39 of a peripheral inner cover plate 38, which is disposed below the cover, and extends across its front transverse area. As can be seen in FIG. 7, lower panel 25 is shorter than the upper panel 24 so as to be radially inwardly recessed in the area of inner cover plate 38, facilitating a low construction height of cover 23 in the edge zone.

In both described variations, all components necessary to effect a change in the light transmissiveness of the panel system are integrated into the cover 3, 23 of the sliding/lifting roof, with the result that its movement, both during upward swinging and during rearward displacement below the fixed roof, occur without impedance. Further advantages are that the electrical contact for the electric motor is realized in a simple manner, and that the hoses required are not subject to any wear, as they are fixedly installed in cover 3, 23. By employing the characteristics of the above-described invention, a stepless darkening of a cover in a sliding/lifting roof is facilitated directly in the area of the panel, which has the advantage that a sliding inner liner, typically arranged below the cover, can be completely dispensed with.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Panel system with variable transparency comprising:

A) two essentially parallel transparent panels;

B) a resilient seal connecting the two panels, said resilient seal enabling the distance between said two panels to be varied;

C) a liquid reservoir in fluid communication with a cavity which is defined between said panels and the resilient seal; and D) a transport element arranged to act upon liquid in the liquid reservoir and serving as a means for controlling the admission and withdrawal liquid from said cavity;

wherein the panel system is incorporated into a movable cover of a vehicle sliding/lifting roof; wherein the panels, the liquid reservoir, and the transport element are supported by a frame element which is located underlying a peripheral area of the movable cover; wherein the transport element comprises a pole-reversible electric motor; and wherein an edge portion of the frame element is provided with a reduced-thickness in at least one area thereof, a resilient contact element for establishing a conductive connection between the electric motor and a vehicle battery, at least in a closed position of the cover, being provided in the edge portion of reduced-thickness; wherein the two panels are arranged one below the other; and wherein a lower one of the two panels is smaller than an upper one of the two panels, terminating inwardly of said peripheral area and creating a space for receiving said liquid reservoir and transport element underlying said peripheral area of the movable cover below the upper panel.

2. Panel system according to claim 1, wherein the reservoir is a flexible container; and wherein the transport element further comprises pump means for conveying liquid from the reservoir to the cavity in a first rotational direction of the electric motor and for withdrawing liquid from the cavity and conveying it to the reservoir in an opposite rotational direction of the electric motor.

3. Panel system according to claim 1, wherein the liquid reservoir is formed by a rigid cylinder; and wherein the transport element further comprises a piston which is displaceable into and out of the rigid cylinder by way of a piston rod disposed at a rear end thereof, said piston rod being acted upon by the electric motor.

4. Panel system according to claim 3, wherein the piston rod is a threaded rod which is acted upon by an annular threaded drive element of the electric motor.

5. Panel system according to claim 1, wherein the electric motor, the transport element, and the liquid reservoir are arranged in a recessed area disposed in a front transverse portion of the frame element.

6. Panel system according to claim 5, wherein the reservoir is a flexible container; and wherein the transport element further comprises pump means for conveying liquid from the reservoir to the cavity in a first rotational direction of the electric motor and for withdrawing liquid from cavity and conveying it to the reservoir in an opposite rotational direction of the electric motor.

7. Panel system according to claim 5, wherein the liquid reservoir is formed by a rigid cylinder; and wherein the transport element further comprises a piston which is displaceable into and out of the rigid cylinder by way of a piston rod disposed at a rear end thereof, said piston rod being acted upon by the electric motor.

8. Panel system according to claim 7, wherein the piston rod is a threaded rod which is acted upon by an annular threaded drive element of the electric motor.

* * * * *